BEST AVAILABLE COP'
Feb. 19, 1963 H. P. KILROY ET AL 3,078,400
PHASE-RESPONSIVE SERVOSYSTEM CONTROL OF A VARIABLE CONDITION HAVING POSITIVE OR NEGATIVE VALUES
Filed Feb. 9, 1960 3 Sheets-Sheet 1
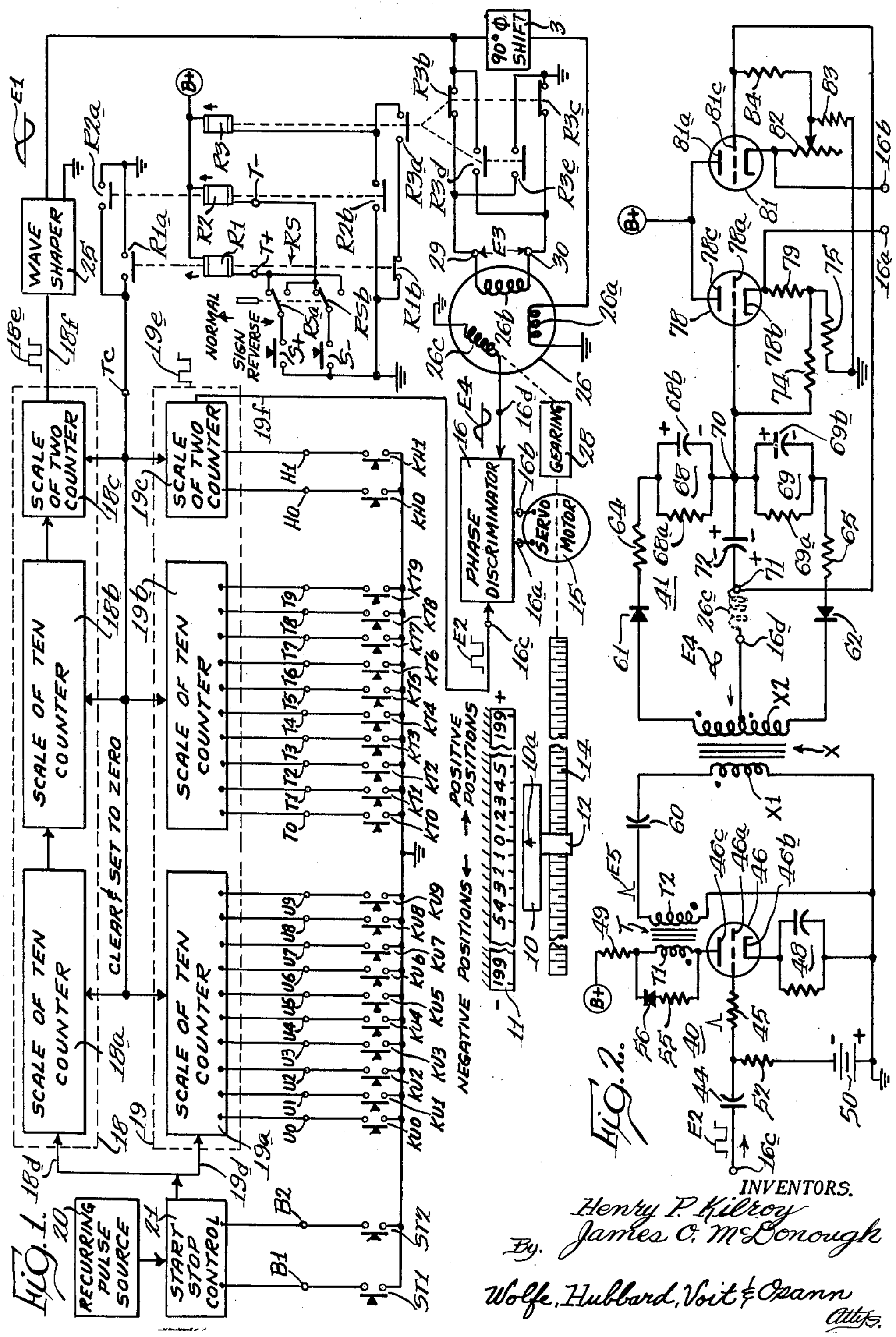
INVENTORS.
Henry P. Kilroy
James C. McDonough
By Wolfe, Hubbard, Voit & Osann
Attys.

BEST AVAILABLE COPY
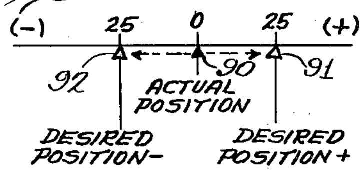
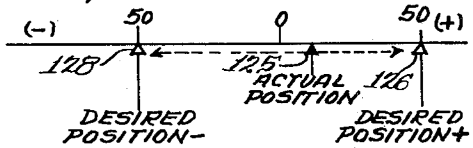
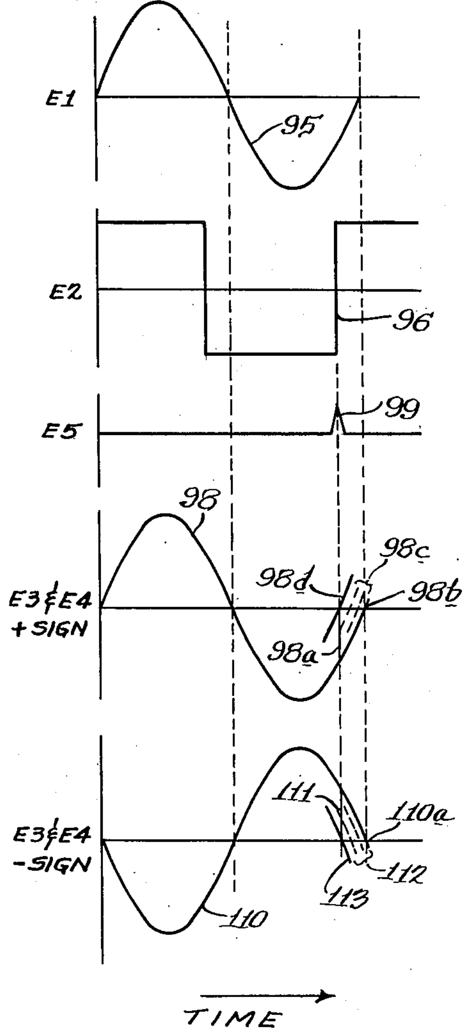
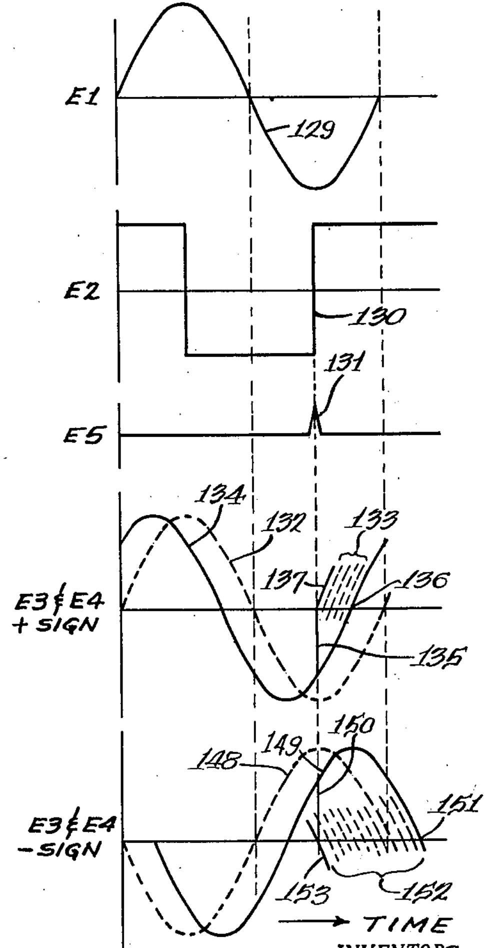
INVENTORS.
Henry P. Kilroy
James O. McDonough
By Wolfe, Hubbard, Voit & Osann
Attys.

BEST AVAILABLE COP'
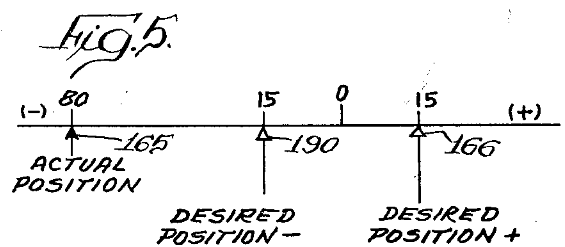
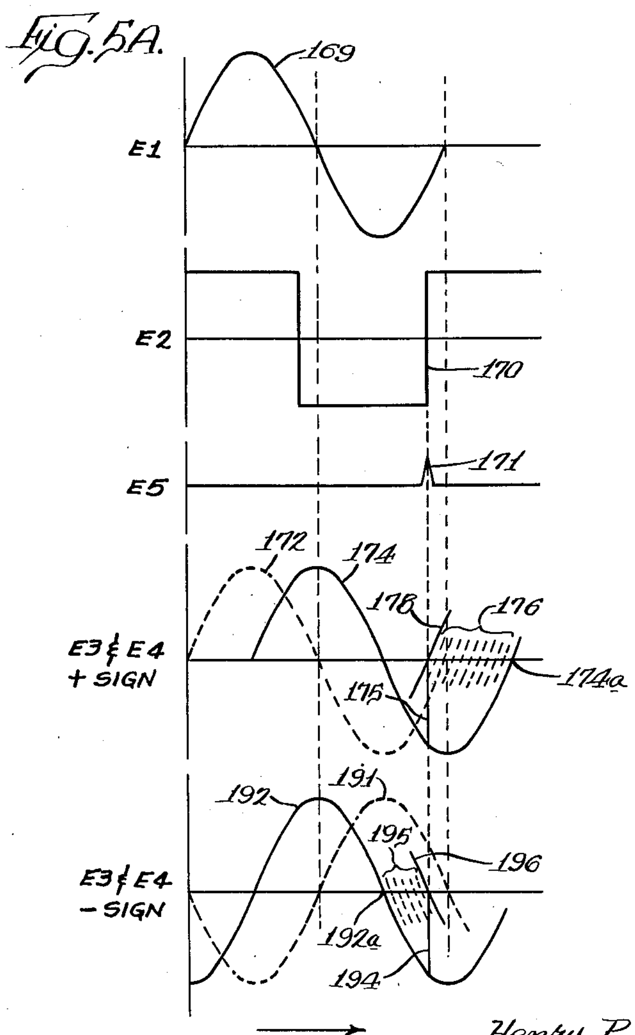
INVENTORS.
Henry P. Kilroy
James O. McDonough
By, Wolfe, Hubbard, Voit & Osann Attys.

BEST AVAILABLE COPY

United States Patent Office 3,078,400

Patented Feb. 19, 1963

3,078,400

PHASE-RESPONSIVE SERVOSYSTEM CONTROL OF A VARIABLE CONDITION HAVING POSITIVE OR NEGATIVE VALUES

Henry P. Kilroy, Littleton, and James O. McDonough, Concord, Mass., assignors to Giddings & Lewis Machine Tool Company, Fond du Lac, Wis., a corporation of Wisconsin Filed Feb. 9, 1960, Ser. No. 7,577

10 Claims. (Cl. 318—28)

This invention relates in general to automatic systems for controlling a variable condition so that it will have different desired magnitudes. More particularly, the invention is concerned with controlling the sign of a condition which is variable in opposite senses from a zero or reference value.

It is the general aim of the invention to determine, by relatively simple and reliable means, the sign of a variable condition as the latter is adjusted to different predetermined magnitudes designated by absolute or "signless" information.

More specifically, an object of the invention is to remove the ambiguities involved in the use of synchronous devices, such as resolvers, which are employed as feedback elements in control systems, assuring that the correct one of two possible null or balance points is achieved according to sign-designating signals.

Another object of the invention is to make possible the setting of a variable condition to a magnitude which is proportional to a phase angle (adjustable over a range of almost 360°) between two recurring signals, and yet to have the sign of the variable condition be either positive or negative relative to a zero reference value.

It is a further object of the invention to make the sign of a variable condition, the magnitude of which is adjusted according to the value of an analogue signal, be either positive or negative, simply by selectively switching the sense or phase with which an exciting signal is supplied to a synchronous feedback device.

Still another object is to assure that a servo control system employing synchronous resolvers or similar feedback elements always seeks and balances at one of two points designated by the same input information but equally displaced from the zero or reference value, the particular one of the two points at which a balancing occurs being determined by a plus or minus sign signal.

Another object of the invention is to make possible a servo control system which receives numerical, digital input information and adjusts a variable condition to either a positive or negative value corresponding to that digital information, yet without requiring that there be a complementing of the input numbers or the extensive and relatively complex apparatus which would be required to effect the complementing function.

An additional object of the invention is to make possible automatic reversal of signs so that input information designating that a variable condition should be adjusted to positive or negative values results in a setting of the condition to the same magnitude but of a negative or positive sign, respectively.

Other objects and advantages will become apparent as the following description proceeds, taken in conjunction with the accompanying drawings, in which:

FIGURE 1 is a diagrammatic illustration, partly in block-and-line form, of an automatic control system embodying the sign control features of the invention;

FIG. 2 is a schematic wiring diagram of an exemplary phase discriminator used in the system of FIG. 1;

FIG. 3 is a chart illustrating the actual value of a variable condition and positive or negative value of equal magnitude to which it is to be adjusted during two typical operational cycles of the control system;

FIG. 3A is a series of curves which illustrate the relative phase variations of different signals in the control system as it carries out the two operational cycles indicated by FIG. 3; and FIGS. 4, 4A and FIGS. 5, 5A are similar to FIGS. 3, 3A, but illustrate the operation of the sign control system for different exemplary operational cycles.

While the invention has been shown and will be described in some detail with reference to a particular, exemplary embodiment thereof, there is no intention that it thus be limited to such detail. On the contrary, it is intended here to cover all modifications, alternatives, and equivalents falling within the spirit and scope of the invention as defined by the appended claims.

Referring now to FIG. 1, the variable condition which is to be controlled, both in sign and magnitude, by the exemplary system is the position of the member 10 movable relative to a stationary scale 11 having a reference or zero point. For convenience of illustration an indicia mark 10a is shown on the member 10, such mark being movable to any point between plus 199 units or minus 199 units as measured from the zero point along the scale 11.

The translation of the member 10 from one position to another is effected by a threaded nut 12 rigidly fixed to the member and engaged with a lead screw 14 which may be driven in opposite directions by a reversible servo motor 15. The servo motor is energized from the output terminals 16a, 16b, of a phase discriminator 16, as will be more fully explained.

The desired magnitude of the variable condition, i.e., the desired position of the member 10 along the scale 11, is initially designated by number-representing input signals which determine the phase displacement between two recurring signals. For generating such signals, a phase shift decoder of the type disclosed and claimed in the copending application of Henry P. Kilroy et al., Serial No. 7,707, filed February 9, 1960, is employed. Briefly stated, such phase shift decoder is here shown as comprising two substantially identical or like scaling chains. The first of these is a reference scaling chain 18 made up of two tandemly connected scale-of-ten counters 18a, 18b and a scale-of-two counter 18c. The second or control scaling chain 19 similarly includes two scale-of-ten counters 19a, 19b and a scale-of-two counter 19c. Assuming that recurring pulses or signals are passed from a source 20 through a start-stop control 21 to input lines 18d and 19d, the two scaling chains 18 and 19 will both scale by total ratios of two hundred. That is, after each one-hundred input signals, the output waveforms 18e and 19e appearing on the scaling chain output lines 18f, 19f will drop from a relatively high to a relatively low voltage, and after the next one-hundred input signals these output waves 18e, 19e will rise from the relatively low to the relatively high voltage. The first and second recurring output signals 18e, 19e are thus in the present instance alternating square waves which pass through one complete cycle in response to each two-hundred input pulses supplied to the input lines 18d, 19d. If the two scaling chains 18 and 19 are both in the same state, i.e., both contain the same "count" such as zero, when the stream of input pulses is initiated, then the output waves 18e, 19e will not only have the same frequency, but will also be exactly in phase.

For a better understanding of the details of the organization and operation of the phase shift decoder formed by the scaling chains 18 and 19, reference may be made to the above-identified Kilroy et al. application. For present purposes, it need only be understood that the scaling chains 18 and 19 may be "cleared," i.e., both set to the same state or "count" in respons eto a signal (e.g., momentary grounding) passed to a clear terminal Tc. It will be assumed for purposes of explanation that a signal on the clear terminal Tc sets all of the counters 18*a*, 18*b*, 18*c* and the counters 19*a*, 19*b*, 19*c* to their zero states or counts. Thereafter, each scaling chain would require two hundred input signals on its input line to produce one full cycle of its output wave. If the recurring input pulses supplied to the input lines 18*d*, 19*d* occur at a rate of 80,000 pulses per second, then the two output wires will have a frequency of 400 cycles per second and will be exactly in phase.

To produce a difference in phase between the reference output wave 18*e* and the control wave 19*e* which corresponds to the magnitude of the desired position of the member 10, provision is made to set the control scaling chain 19 to an initial state or count designating the numerical value of the desired position. For this purpose, the counter 19*a* has ten "setting" terminals U0–U9, the counter 19*b* has setting terminals T0–T9, and the counter 19*c* has setting terminals H0 and H1. By applying a momentary signal (zero volts or ground potential) to one of each of the terminal groups U0–U9, T0–T9 and H0, H1, the scaling chain 19 may be set to one of 200 corresponding states or counts, as more fully explained in the aforementioned Kilroy et al. application.

While the "setting" terminals of the scaling chain may receive signals derived from reading a record device, such as a punched tape, there are here illustrated for purposes of simplicity corresponding pluralities of key switches KU0–KU9, KT0–KT9 and KH0, KH1. Momentary depression of any of these key switches momentarily connects the corresponding setting terminal to a point of ground potential. To "set" any number between 0 and 199 into the scaling chain 19, the appropriate one of each of the three groups of key switches is actuated. For example, if the key switches KH1, KT2 and KU5 are momentarily closed, the counters 19*c*, 19*b* and 19*a* will be respectively set to the "1," "2," and "5" states, thus being respectively conditioned or placed in the same states which they would have if they received 125 input pulses after being initially set to their zero states. The conditions or states of the counters 19*c*, 19*b* and 19*a*, respectively, represent the hundreds, tens and units digits of a three-place decimal number. The actuation of key switches KH1, KT2 and KU5, therefore, will set the scaling chain 19 to a count of "125." Thus, only seventy-five input signals need be received on the input terminals 19*b* to produce a positive-going transition in the control wave 19*e*. Therefore, if the scaling chain 19 is preset to a count of "125" higher than the count set into the reference chain 18, and identical recurring input signals are then supplied to the two scaling chains, the counter of the control chain will always be $$\frac{125}{200}$$

or 5/8 of a cycle ahead of the reference chain. Thus, the control wave 19*e* will lead the reference wave by a phase angle of 5/8×360° or 225°.

It will be apparent from the foregoing example, that by selectively actuating the "setting" key switches KU0–KU9, KT0–KT9 and KH0, KH1, the control chain 19 may be set to any "count" of 0 through 199, and that subsequent scaling action of the two chains 18 and 19 will thus produce a control waveform 19*e* which leads by any selected multiple of 1.8° between 0 and 358.2° the reference waveform 18*e*. Any such selected phase angle between the signals 18*e*, 19*e* will be maintained so long as input pulses continue to arrive on the input lines 18*d*, 19*d*.

Once the control chain 19 has been set to a count corresponding to input data, a start signal is momentarily applied to a terminal B1 by closure of a key switch ST1 and serves to condition the start-stop control 21 so that pulses are passed from the source 20 to the input lines 18*d*, 19*d*. At the completion of a given positioning operation, a second switch ST2 may be momentarily closed to ground a terminal B2, thus "closing" the start-stop control 21 to prevent input pulses from reaching the input lines 18*d*, 19*d*. The scaling chains may then be cleared and reset according to information for the next positioning cycle.

During a positioning cycle of operation, the reference wave 18*e* is passed through a wave-shaping circuit 25 to convert the output square wave to a sinusoidal wave E1 which will be hereafter termed the "first recurring signal" or "reference wave." It is a "reference wave" because the second recurring signal or control wave 19*e* produced by the scaling chain 19 may lead the wave E1 by a phase angle which is proportional to the numbers previously set into the control chain 19.

To serve as a feedback device for producing a signal indicative of the actual value of the changeable condition, i.e., the actual position of the member 10, a synchronous coupling device is employed. Such a feedback device has as its function the generation of a signal which shifts in phase relative to some reference by amounts and in directions which correspnod to the extent and sense of the changes in the variable condition. The feedback device may take a variety of forms such as a differential transformer, an "Inductosyn" type resolver or a phase-shifting capacitor having relatively movable elements. It will employ a stator part and a movable part having electrical elements thereon which, by changes in coupling with relative movement, produce a change in phase of an output signal created in one electrical element relative to an input signal applied as the excitation for the other element. The relative movement between the two parts of the feedback device is effected in the sense and extent from a zero position in accordance with the sense and extent of the variable condition from its zero or reference value.

In the specific example shown by FIG. 1, the feedback device takes the form of a two-phase synchronous resolver 26 having stator windings 26*a* and 26*b* physically separated by 90° and associated with a rotor carrying a rotor winding 26*c*. As is well known, when the two stator windings 26*a*, 26*b* of such a synchronous resolver are excited with sinusoidal voltages separated by 90° in phase, a rotating magnetic field is set up within the stator which induces an alternating sinusoidal voltage in the rotor windings 26*c*. The amplitude of the voltage induced in the rotor winding is substantially constant as the rotor assumes different angular positions. However, as the rotor turns through one revolution, the phase of the rotor voltage will be progressively shifted through 360°. The resolver 26 is thus used to produce a constant amplitude variable phase output signal rather than in the more conventional manner to produce a variable amplitude, reversible phase signal.

To make the phase of the voltage induced in the rotor 26*c*, relative to the exciting voltage supplied to one of the stator windings, vary with the actual position of the movable member 10, the rotor of the resolver is connected through appropriate reduction gearing 28 to the motor 15 and the lead screw 14. The ratio of the reduction gearing 28 in the present example is chosen such that the resolver rotor makes one complete revolution as the member 10 traverses two hundred units along the scale 11, that is, so that movement of the member 10 through one unit changes the phase of the rotor voltage by 1.8°.

The reference wave E1 derived from the scaling chain 18 is utilized as the exciting voltage for the stator windings 26*a* and 26*b*. For this purpose, the reference wave E1 is passed through normally closed contacts R3*b* to the terminal 29 of the winding 26*b*, while the opposite terminal 30 of that winding is returned to a point of ground potential through the normally closed contacts R3*c*. The function of the contacts R3*b*, R3*c* will be made clear below. The reference wave E1 is also passed through a 90° phase shifter 31, so that it is in phase quadrature with the sinusoidal voltage applied to the winding 26*b*, and then applied to the stator winding *26a*. The combined excitation of the stator windings *26a* and *26b* thus creates a rotating magnetic field in the resolver 26 which induces a constant amplitude alternating sinusoidal wave, here designated E4, in the rotor winding *26c*. The phase of the voltage wave E4 relative to the reference wave E1 thus shifts 360° as the rotor turns through one full revolution. The phase of the rotor signal E4 relative to the reference wave E1 is an indication or measure of the actual position of the member 10 along the scale 11.

The control signal *19e* produced by the scaling chain 19 leads the reference wave E1 by a phase angle proportional to the desired position of the member 10 (measured from the zero or reference point of the scale 11). Therefore, the difference in phase between the control wave *19e* and the rotor signal E4 represents the position error, i.e., the difference between the actual position in which the member 10 is residing and the desired position designated by the numbers originally set into the scaling chain 19. To produce translation of the member 10 to the desired position, and thus reduce the error to zero, the control wave *19e* is supplied (and designated by the character E2) to one input terminal *16c* of the phase discriminator 16. The rotor signal E4 is supplied to the other discriminator input terminal *16d*.

The phase discriminator 16 may take any one of a variety of forms known to those skilled in the art, and operates to produce on its output terminals *16a*, *16b* a direct current voltage which is proportional in magnitude and agreeable in polarity with the extent and the sense of the phase angle between the input signals E2 and E4. This changeable polarity, variable amplitude signal appearing on the terminals *16a*, *16b* energizes the motor 15 to rotate in one direction or the other until the rotor winding *26c* is translated to an angular position at which the rotor voltage E4 comes into "phase agreement" with the control voltage E2. As an incident to such energization of the motor 15 and drive of the resolver rotor to a balance point, the lead screw 14 is rotated in one direction or the other to translate the member 10 to the right or left until it reaches the desired position.

At this point it will be helpful to arbitrarily designate the senses of certain reversible movements, reversible polarities, or reversible rotations. Let it be assumed that when the motor 15 receives a negative input voltage (i.e., the terminal *16a* is negative relative to the terminal *16b*), the lead screw 14 is driven in such a direction that the member 10 is moved to the right. Conversely, when the output voltage of the discriminator 16 is positive (i.e., the terminal *16a* is positive relative to the terminal *16b*) then the motor 15 rotates in such a direction as to move the member 10 to the left. Let it be assumed further that when the motor 15 drives the movable member 10 to the right or left, then the rotor and the rotor winding *26c* are rotated in counterclockwise or clockwise directions respectively.

Assume, still further, that when the reference wave E1 is applied through the normally closed contacts E3*b* and E3*c* to the stator winding *26b*, the exciting voltage E3 is "in phase" with the reference voltage E1 and the rotating magnetic field set up within the resolver 26 turns in a clockwise direction. Under these circumstances, when the rotor turns physically in a counterclockwise direction, the voltage E4 induced in the rotor winding *26c* is progressively phase shifted in a leading sense relative to the exciting voltage E3 applied to the stator winding *26b*. Conversely, if the resolver rotor is turned in a clockwise direction as the movable member 10 is being driven to the left, then the voltage induced in the rotor winding *26c* is progressively shifted in a lagging direction relative to the voltage E3 applied to the stator winding *26b*.

Finally, let it be assumed that when the alternating wave E4 applied to the discriminator terminal *16d* lags or leads the recurring wave E2 applied to the discriminator input terminal *16c*, the discriminator produces a negative or positive voltage, respectively, on its output terminals *16a* and *16b*, and thus energizes the motor 15 to rotate in a direction which will shift the member 10 to the right or to the left.

In accordance with the present invention, the sign of the variable condition, i.e., the position of the member 10 to the right or left of the zero point on the scale 11, is determined by plus or minus sign signals which are applied respectively to terminals T+ or T−, despite the fact that the phase of the control valve *19e* always leads the reference wave E1 by an angle proportional to the magnitude of the desired position. Such sign-designating signals in the present instance are the momentary application of ground potential to the terminals T+ or T−. These sign-designating signals may be derived from a variety of control circuitry such as apparatus for reading digital information from a record device or punched tape. In the interest of simplicity in the present illustration, however, a plus sign signal or momentary grounding of the terminal T+ is produced by momentary closure of a key switch S+ connected between a point of ground potential and the terminal T+. Likewise, a minus sign signal is created by a momentary closure of a key switch S− which is connected between a point of ground potential and the terminal T−.

Closure of the sign-selecting switches S+ or S− will result in momentary energization of relay coils R1 or R2 which lead to a point of positive potential here represented conventionally by the symbol B+. Momentary pick-up of the relay R1 or the relay R2 briefly closes their contacts R1*a* or R2*a*, and thus momentarily grounds the terminal *Tc* to clear and set all of the counters *18a*, *18b*, *18c* and *19a*, *19b*, *19c* to their zero states. Momentary pick-up of the relay R1 will also result in opening of its normally closed contacts R1*b*, thereby assuring that an auxiliary sign control relay R3 is deenergized. On the other hand, momentary pick-up of the relay R2 will result in closure of its contacts R2*b* which create an energization circuit for the auxiliary relay R3 so that the latter picks up and closes its normally open contacts R3*a* to create a sealing circuit through the normally closed contacts R1*b*. Thus, after a plus sign signal has been received, the relay R3 will be deenergized, and after a minus sign signal has been received the relay R3 will be energized and sealed in.

At the beginning of a positioning cycle, the sign of the value desired for the position of the member 10 is first designated by one of two sign signals, i.e., momentary closure of one of the sign switches S+ or S−. This will result either in the relay R3 being dropped out (plus sign) or picked up (minus sign) and will also result in momentary grounding of the clear terminal *Tc* so that the scaling chains 18 and 19 are both cleared and set to the same zero state. The magnitude of the desired position of the member 10 is then designated by actuating one of the key switches in each of the groups KU0 through KU9, KT0 through KT9 and KH0, KH1. If it is desired to move the member 10 to a position of "+125" units along the scale 11, therefore, the key switch S+ will be first actuated, followed by actuation of the key switches KH1, KT2 and KU5 so that the number set into the scaling chain 19 is "125."

In carrying out the present invention, provision is made to create a recurring feedback wave in response to a plus sign signal which undergoes changes in phase in a first sense or a second sense as the variable condition changes positively or negatively. Moreover, provision is made always to cause a negative or positive change in the variable condition whenever the condition error is positive or negative, i.e., when the actual value of the condition is more positive or negative than the desired value.

As here shown, the foregoing is accomplished by exciting stator winding *26b* of the resolver 26 with the reference wave E1 through the contacts R3*b*, R3*c* which are always closed in response to a plus sign signal, as previously described. This makes the excitation voltage E3 "in phase" with the reference wave E1 and produces a magnetic field in the resolver stator which turns in a clockwise direction at the synchronous frequency of the reference wave E1. Thus, as the member 10 moves positively (to the right) or negatively (to the left) and the resolver rotor turns counterclockwise or clockwise relative to the stator, the feedback wave E4 induced in the rotor winding 26*c* shifts progressively in a leading or lagging direction relative to the excitation voltage E3 and the reference voltage E1.

The discriminator 16, motor 15 and the drive connections afforded by the lead screw 14 and the nut 12 are constructed such that when the feedback wave E4 is displaced in the first or second sense (leading or lagging) relative to the control wave E2 the member 10 is driven in a negative or positive direction (left or right). Therefore, when the member 10 is displaced to the right or left of the desired position (designated in magnitude by the leading phase angle of the control wave E2 relative to the reference wave E1), the feedback wave E4 will lead or lag the control wave E2 and the discriminator 16 will cause the motor 15 to drive the member 10 to the left or to the right, respectively, until it reaches a balance point at which the feedback wave E4 comes into "phase agreement" with the control wave E2.

Further, in carrying out the invention, means are provided which are responsive to a minus sign signal for creating a feedback wave which undergoes changes in phase in the second or the first sense, respectively, as the variable condition changes positively or negatively. Moreover, provision is made to cause a negative or positive change in the variable condition whenever the feedback wave has a phase displacement in the first or second sense, respectively, relative to the control wave. In other words, the apparatus responds to a minus sign signal by reversing the direction of phase shift of the rotor voltage E4 relative to the excitation voltage E3 when the resolver rotor turns in a given direction, as compared to the operation responsive to a plus sign signal. However, the apparatus is caused in response to a minus sign signal to effect a change in the variable condition in the same direction (negative or positive) as it did in response to a plus sign signal whenever the condition error is positive or negative.

As here shown, the foregoing is accomplished by exciting the stator winding 26*b* of the resolver 26 with the reference wave E1 passed through the contacts R3*d* and R3*e* (rather than the contacts R3*b* and R3*c*) which are always closed in response to a minus sign signal as described above. This makes the excitation voltage E3 opposite in phase to the reference voltage E1, i.e., the excitation voltage E3 is displaced 180° relative to the reference wave E1. As a result, the rotating magnetic field produced in a resolver 26 now turns in a counterclockwise direction. Thus, as the member 10 moves positively (to the right) or negatively (to the left) and the rotor winding turns counterclockwise or clockwise relative to the stator, the voltage E4 shifts progressively in a lagging or leading direction relative to the excitation voltage E3. However, the zero position of the resolver rotor is selected such that the stator winding 26*b* has maximum inductive coupling to the rotor winding 26*e* when the member 10 is in its zero position. Thus by making the excitation voltage E3 opposite in phase to the reference wave E1 by passing the latter through the contacts R3*b* and R3*e*, the rotor voltage E4 is reversed 180° in phase when the resolver rotor is in its zero position. Therefore, when the member 10 is displaced to the right or the left of the desired actual position, the feedback wave will still respectively lead or lag the control wave E2, and the discriminator 16 will cause the motor 15 to drive the member to the left or right, respectively, to a point at which the feedback E4 comes into "phase agreement" with the wave E2.

The rationale of the switching system action produced by the relays R1, R2 and R3 and the operation of the system in response to plus and minus sign signals will be made clearer by reference to FIGS. 3–5 and FIGS. 3A–5A. It will be helpful in understanding these figures to consider first the details and operation of an exemplary phase discriminator 16 such as that shown in block form in FIG. 1.

Referring to FIG. 2, the phase discriminator there illustrated comprises as its basic components a differentiator circuit 40, a phase comparison circuit 41 and a differential amplifier 42. The input terminals 16*c*, 16*d* and the output terminals 16*a*, 16*b* correspond to those shown in FIG. 1. It will be apparent from FIG. 2 that the recurring control signal (which is a square wave voltage) E2 is applied between the terminal 16*c* and a point of ground potential, being coupled through a capacitor 44 and a resistor 45 to the control electrode 46*a* of an amplifier here shown as a triode vacuum tube 46. The cathode 46*b* of this tube is connected to a point of ground potential through a conventional self-biasing circuit 48 while the anode 46*c* is connected through the primary winding T1 of a transformer T and a load resistor 49 to a positive voltage source, here represented conventionally by the symbol B+. The control electrode 46*a* is normally biased below cut-off by a negative biasing voltage source illustrated as a battery 50 connected between a point of ground potential and the control electrode 46*a* by resistor 52.

So long as the control wave E2 is at the more negative of its two levels the amplifier tube 46 will be cut off. However, when the control wave E2 swings from its more negative to its more positive value, the tube 46 is rendered conductive and current flows through the transformer winding T1. This abrupt increase in current induces a positive voltage pulse E5 in the secondary winding T2 of the transformer. The primary winding of the transformer T1 is shunted by a dissipating resistor 55 and a diode 56 which is poled to oppose current flow from the B+ source. When the tube 46 cuts off after producing a voltage pulse E5, the diode 56 becomes conductive in response to the reverse voltage induced in the winding T1, so that the energy stored in the transformer winding is dissipated in the resistor 55. It will be understood therefore, that a positive-going voltage pulse E5 is produced by the differentiator circuit 40 each time that the input control valve E2 swings in a positive-going direction, i.e., from its lower to its higher level. No response is produced whenever the control wave E2 swings in a negative-going direction, i.e., from its higher to its lower value.

The voltage pulses E5 which occur in time coincidence with the positive-going swings of the control wave E2 are coupled through a capacitor 60 to the primary winding X1 of a transformer X having a center-tapped secondary winding X2. Each time that a voltage pulse E5 is supplied to the primary winding X1, the upper end of the secondary winding X2 is made momentarily positive relative to the center tap or input terminal 16*d*, while the lower end of the secondary winding X2 is made momentarily negative relative to the center tap. The opposite ends or extremities of the secondary winding X2 are connected through unidirectionally conductive diodes 61 and 62 and resistors 64 and 65 to the opposite extremities of smoothing filters 68 and 69. The diodes are poled to conduct current in response to the voltage pulses induced in the secondary winding X2. The filters may comprise simply a parallel combination of resistors 68*a*, 69*a* and capacitors 68*b* and 69*b*, leading to a common junction 70.

Since the point 71 shown in FIG. 2 is connected to ground, the sinusoidal feedback wave E4 induced in the rotor winding 26*c* (FIG. 1) is applied between the center tap 16*d* and one side of a capacitor 72 which has its opposite side connected to the common junction 70. Assuming for the moment that no feedback wave E4 is being induced in the rotor winding 26*c*, the diodes 61 and 62 will both be made momentarily conductive each time that

BEST AVAILABLE COPY an input voltage E5 is applied to the primary winding X1. Since the resistors 64, 65 and the filter network 68, 69 are symmetrical, equal currents will flow through the diodes 61, 62 in response to each input pulse of E5 thus charging the capacitors 68*b*, 69*b* to equal voltages. Because the currents flowing through the two diodes 61 and 62 tend to oppositely charge the capacitor 72, the latter will be left with zero voltage across it. Capacitors 68*b* and 69*b* are charged to equal voltages of the polarity indicated which has a magnitude slightly greater than the largest amplitude of the input voltage E4, so that the voltage E4 cannot by itself make the diodes 61 or 62 conductive.

If it is now assumed that the sign wave E4 from the synchro winding 26*c* appears between the terminals 16*b* and 71, there will be either a positive or a negative voltage applied between those terminals at the instant that the diodes 61 and 62 are made conductive by an input pulse E5 unless that input pulse coincides with an instant in time when the wave E4 is crossing the zero axis. Assuming for the moment that the sinusoidal wave E4 has a positive value (i.e., makes terminal 16*d* positive relative to terminal 71) at the instant that the pulse E5 arrives, then a larger current will flow through diode 61 than the diode 62, and the capacitor 72 will be charged to a voltage which corresponds to the instantaneous amplitude of the wave E4 at the instant that the input pulse E5 occurs. This will charge the capacitor 72 to a voltage of the polarity shown by symbols on the upper side of the capacitor.

Conversely, if the voltage E4 is negative at the instant that the diodes 61 and 62 are made conductive by a pulse E5, more current will flow through the diode 62 than through the diode 61, and the capacitor 72 will be charged negatively to a voltage which agrees in magnitude with the instantaneous magnitude of the wave E4 when the pulse E5 occurs. The polarity of the voltage across capacitor 72 when charged in this manner is illustrated by the symbols beneath that capacitor in FIG. 2.

It will be understood therefore, that at the instants when the input pulses E5 occur, the feedback wave is "sampled" and the capacitor 72 is charged to a voltage which agrees in polarity and magnitude with the instantaneous polarity and amplitude of the voltage E4 when sampling occurs. Thus, if the feedback voltage E4 lags the control voltage E2, the capacitor 72 will be charged negatively to make the terminal 70 negative relative to ground potential; however, if the feedback wave E4 leads the control wave E2 the capacitor 72 will be charged positively, thus making the junction 70 positive relative to ground potential. The magnitude and polarity of voltage across the capacitor 72 is changeable as the relative phase of the waves E4 and E2 changes because the capacitor 72 may discharge slowly through diodes 61 or 62, but it will be recharged to the correct polarity and voltage magnitude each time that the sampling action occurs. For practical purposes, it may be assumed that the voltage of the junction 70 is a D.-C. voltage which is negative or positive when the feedback wave E4 lags or leads the control wave E2, and that the magnitude of this voltage on the junction 70 depends upon the instantaneous amplitude of the feedback wave E4 when sampling occurs.

The variable polarity D.-C. voltage appearing at the junction 70 is amplified by the difference amplifier 72. For this purpose, the junction 70 is connected to the control electrode 78*a* of a triode amplifier 78 connected as a cathode follower. The cathode 78*b* of the tube 78 is connected through load resistors 79 and 75 to a point of ground potential and its anode 78*c* leads to a point of positive potential here represented conventionally by symbol B+. A second triode amplifier 81 is also connected as a cathode follower, having its anode 81*a* connected to the positive voltage source, and its cathode connected through a variable resistor 82 and a fixed resistor 83 to ground. The control electrode 81*c* of the tube 81 is connected to the junction 71 so that the voltage across the capacitor 72 is applied between the control electrodes 78*a* and 81*c*. The control electrode 81*c* is returned to the upper end of resistor 83 by a resistor 84. The current flow through the cathode follower 81, therefore, has a steady value which is determined by the adjustment of the variable resistor 82. The resistor 82 is adjusted such that when the feedback wave E4 is in phase agreement with the control wave E2, i.e., the sampling pulses E5 occur at the same instant that the wave E4 is crossing the zero axis, then the two cathodes 78*b* and 81*b* have the same potential. The voltage between the output terminals 16*a* and 16*b* connected to these cathodes, therefore, has a zero value when there is phase agreement between the control wave E2 and the feedback wave E4. As the feedback wave E4 becomes more and more lagging or leading relative to the control wave E2, then the current through the tube 78 respectively decreases or increases, and the current through the tube 81 respectively increases or decreases, thus creating a progressively increasing negative or positive voltage between the output terminals 16*a* and 16*b*.

Summarized, the phase discriminator shown in FIG. 2 as one example of the variety of circuits which may be employed, produces a control signal or output voltage on the terminals 16*a*, 16*b* which is negative or positive in polarity depending upon whether the feedback wave E4 lags or leads the control wave E2. The magnitude of this changeable polarity voltage depends upon the instantaneous amplitude of the feedback wave E4 at the instant when the sampling pulses E5 occur, that is, when the control wave E2 swings from its lower to its higher level.

The operation of the sign control apparatus described above in connection with FIG. 1 may best be understood by reference to specific and exemplary operation cycles. Assume that the member 10 is initially in the zero position as indicated by the marker 90 in FIG. 3. Let it be assumed, further, that the decimal number "25" has been set into the control scaling chain 19, thus designating that the desired position of the member 10 is either at a positive or negative displacement of 25 units represented by the markers 91 and 92 in FIG. 3. Assume for the initial cycle of operation that it is desired to move the member 10 to a positive position along the scale 11, i.e., to the point 91 in FIG. 3, rather than to the point 92. This means that the positive sign switch S+ in FIG. 1 was actuated prior to setting the number "25" into the scaling chain 19. The relay R3 is thus de-energized and the reference wave E1 is connected through the contacts R3*b* and R3*c* to the stator winding 26*b* so that the exciting voltage E3 is in phase with the reference wave. The reference wave E1 is represented by a curve 95 at the top of FIG. 3A. With the scaling chain 19 having been set to a count of "25" greater than the state of the reference chain 18, the control wave E2 (curve 96) will be a recurring square wave of the same frequency as the reference wave E1, but leading the latter by an angle of 45 degrees. The voltage E3 (curve 98) is exactly in phase with the reference voltage E1. Because the rotor of the resolver 26 and the movable member 10 are initially in their zero positions as indicated by the marker 90 in FIG. 3, the rotor voltage E4 is in phase with the voltage E3 and represented by the same curve 98.

Each time the control wave E2 (curve 96) swings from a negative to a positive value as indicated in FIG. 3A, a sampling pulse E5 shown at 99 will be created in the discriminator of FIG. 2. Accordingly, the output voltage under these conditions on the discriminator terminals 16*a* and 16*b* will be negative in polarity as represented by the line 98*a* in FIG. 3A, and the motor 15 will be energized to drive the member 10 to the right. This will move the marker 90 of FIG. 3 which represents the actual position of the member 10 to the right toward the marker 91.

It will also cause the rotor of the resolver 26 to turn counterclockwise so that the rotor voltage E4 shifts progressively in a leading direction relative to the exciting voltage E3. Thus the positive going transition of the rotor voltage E4 shown at point 98*b* in FIG. 3A will shift progressively to the left through a series of positions represented by the lines 98*c*. That is, the rotor voltage E4 will be shifted in a leading direction until the positive-going transition point reaches the position shown by a line 98*d* in FIG. 3A. At this time the control wave (curve 96) and the feedback wave (curve 98) are in phase so that the voltage appearing across the discriminator output terminals 16*a*, 16*b* is reduced to zero, and the motor 15 comes to a stop after having moved the member 10 (FIG. 1) to the right until it has reached a positive position of 25 units along the scale 11. The switch ST2 may now be actuated to terminate the passage of input pulses to the scaling chains 18, 19 (FIG. 1), and the system is ready to receive another set of information for the next positioning cycle.

To contrast this operation, assume now that the desired position of the member 10 is not a positive displacement, but on the contrary is a negative displacement represented by the marker 92 in FIG. 3. The minus sign switch S— will have been momentarily closed at the beginning of the operational cycle and the relay R3 will be picked up and sealed in so that its contacts R3*d* and R3*e* (FIG. 1) connect the reference voltage E1 with reversed phase to the stator winding 26*b*. Under these circumstances, the reference wave and the control wave are still properly illustrated by the curves 95 and 96 in FIG. 3A, and the time instant at which a sampling pulse E5 occurs is correctly represented by the pulse 99. However, with the contacts 3*b* and 3*e* closed, the excitation voltage E3 (curve 110) applied to the stator 26 is now 180° out of phase with the reference wave E1. Since it is assumed that initially the movable member 10 and the resolver rotor are in their zero positions at which the stator winding 26*b* has maximum coupling to the winding 26*c*, rotor voltage E4 initially is in phase with the exciting voltage E3 and is also represented by the curve 110 in FIG. 3A.

At the instant of sampling when the pulse 99 occurs, the rotor voltage E4 has a positive instantaneous value represented by the line 111 in FIG. 3A. Accordingly, the output voltage appearing on the terminals 16*a* and 16*b* of the phase discriminator 16 is positive in sense, and thus causes drive of the movable member 10 to the left and rotation of the resolver rotor in a clockwise direction. Because the direction of rotation in the magnetic field in the resolver 26 has been reversed (i.e., is counterclockwise for a minus sign signal as opposed to clockwise for a plus sign signal), this clockwise rotation of the resolver rotor makes the rotor voltage E4 shift progressively in a leading direction. Accordingly, the zero axis crossing 110*a* of the curve 110 representing the feedback voltage E4 is shifted progressively to the left (as represented in FIG. 3A by the series of lines 112) until it reaches the position illustrated by the line 113. At this point the amplitude of the rotor voltage E4 at the instant of the sampling pulse 99 is zero, and the output of the phase discriminator is reduced to zero, so that the member 10 is brought to halt at a balance point of minus 25 units along the scale 11. It will be observed that the rotor voltage is thus correctively shifted until it is in "phase agreement" or 180° out of phase with the control voltage E2 (curve 96). The term "phase agreement" as used herein denotes the condition where two recurring waves are either in phase or 180° out of phase.

It will be seen from the comparison of the curves 98 and 110 in FIG. 3A that the reversal of connections effected by actuation of the relay R3 to reverse the phase of the exciting voltage E3 applied to the stator winding 26*b* not only changes the sense in which the phase of the rotor voltage E4 shifts for given direction of rotation of the resolver rotor, but also changes the phase of the rotor voltage by 180° when the rotor is in its zero position. Thus, the corrective displacement of the movable member 10 is in the proper direction to move the member 10 to a negative position along the scale when a minus sign signal has been received.

Still other examples of operational cycles are demonstrated by FIG. 4 and FIG. 4A. Let it be assumed that the movable member 10 initially resides at a position of +25 units represented by the marker 125 in FIG. 4 and that it is desired to move the table 10 to a desired position indicated at 126 displaced positively 50 units. To effect such movement, the plus sign switch S+ (FIG. 1) is first actuated to pick up the relay R1 thereby clearing the scaling chains 18, 19 and assuring that the relay R3 is deenergized. Next, the number "050" representing 50 units is keyed into the switches to set the scaling chain 19. As a result of this operation, the contacts R3*b*, R3*c* are closed, while the contacts R3*d*, R3*e* are open. The switch ST1 is then depressed to initiate passage of pulses into the scaling chains.

Referring to FIG. 4A, the control wave E2 (curve 130) produced by the scaling chain 19 leads the reference wave E1 (curve 189) by 90° because the number "50" has been initially set into the scaling chain 19. Sampling pulses 131 forming the voltage signal E5 occur at instants when the square wave 130 switches from a positive to a negative level.

With the contacts R3*b*, R3*c* closed, the excitation voltage E3 (curve 132) applied to the stator winding 26*b* is in phase with the reference voltage E1. The curve 132 represents the phase which the rotor voltage E4 would have if the resolver rotor were in its zero position. However, as indicated by the marker 125 in FIG. 4, it is assumed that the member 10 is initially displaced +25 units. This means that the voltage E4 (curve 134) induced in the rotor winding 26*c* leads the voltage E3 by a proportional amount, i.e., 45°, at the beginning of the operation cycle. At the instant of the pulse 131, the rotor voltage E4 represented by the curve 134 has a negative value designated by the line 135. Thus, the output of the discriminator 16 supplied to the motor 15 is of negative polarity and causes the motor 15 to drive the member 10 to the right and the resolver rotor in a counterclockwise direction. Since the magnetic field of the resolver 26 is rotating in a clockwise direction by virtue of the connection established through the contacts R3*b*, R3*c*, such counterclockwise rotation of the rotor results in the rotor voltage E4 (curve 134) being shifted in a progressively leading direction, i.e., to the left as shown by the series of lines 133 in FIG. 4A until the positive-to-negative transition originally appearing at point 136 is shifted to the position 137 at which the output voltage of the discriminator is reduced to zero. Thus, with plus sign information represented by the deenergized state of the relay R3, the system moves the member 10 from the point shown at 125 in FIG. 4 to the point shown at 126 in FIG. 4.

Assume now that, instead of a plus sign signal having been received, a minus sign signal is received when the movable member 10 is initially at the position shown by the marker 125 in FIG. 4. The desired position of the movable member 10 is now —50 units along the scale 11 as represented by the marker 128. The relay R3 will be actuated so that its contacts R3*b*, R3*c* are opened, and its contacts R3*d*, R3*e* are closed. Accordingly, the excitation voltage E3 (curve 148 in FIG. 4A) is displaced 180° in phase relative to the reference wave E1 (curve 129). And because the member 10 is initially assumed to be in position of +25 units, the voltage induced in the rotor winding 26*c*, i.e., the feedback wave E4 (curve 149) lags the excitation voltage or curve 148 by 45°. Thus, at the sampling instant of the pulse 131, the rotor voltage E4 has a positive value represented by the line 150. This causes the discriminator to produce a positive output voltage which makes the motor 15 drive the member 10 to the left and the resolver rotor in a clockwise direction. Because the magnetic field within the resolver 26 is now rotating counterclockwise, however, such clockwise rotation of the rotor results in the voltage E4 (curve 149) being shifted progressively in a leading direction. That is, zero-crossing point 151 of the curve 149 is shifted progressively to the left in FIG. 4A as represented by the series of lines 152 until it reaches the position shown by the line 153, and the voltage E4 thus has a zero value at the instant of the sampling pulse 131. The system thus becomes balanced after the actual position of the member 10 has been changed from +25 units to −50 units.

In some instances, the movable member 10 may be initially displaced so far from its zero position that it must move in the same direction to reach either of two positive or negative desired positions. This operation is illustrated by FIGS. 5 and 5A. Assume that the member 10 is initially at a negative position (−80 units) represented by a marker 165 (FIG. 5), and that it is desired to move the member 10 to a first positive desired position (+15 units) represented by a marker 166. If it is assumed that the desired position 166 in FIG. 5 is +15 units, then the control wave E2 (curve 170 in FIG. 5A) leads the reference wave E1 (curve 169) by an angle of 27°. The voltage E5 includes a pulse 171 which occurs each time that the control wave E2 swings from its negative to its positive value. Since a positive sign signal has been received so that the relay R3 is deenergized, then the excitation voltage E3 (curve 172 in FIG. 5A) is in phase with the reference voltage E1 (curve 169). However, the angular displacement of the rotor when the member 10 is at the position shown at 165 (−80 units) makes the rotor voltage E4 (curve 174) lag the excitation voltage 172 by an angle of 144°. Under these circumstances, at the instant of the sampling pulse 171, the rotor voltage E4 has a negative value represented by the line 175 in FIG. 5A, so that the motor 15 is energized to drive the member 10 to the right and to turn the rotor of the resolver 26 in a counterclockwise direction. Because the magnetic field of the resolver 26 is rotating in a clockwise direction, such rotation of the rotor causes the rotor voltage E4 to shift progressively in a leading direction. Thus, the zero point **174*a* on the curve 174 shifts progressively to the left as represented by the lines 176 in FIG. 5A until it reaches the position shown by the line 178. At this time, the output of the phase discriminator is reduced to zero and the member 10 is brought to a halt after having been moved 95 units to the right from the point 165 to the point 166** in FIG. 5.

Assume now that the initial position of the member 10 is that designated by the marker 165 in FIG. 5, but that the desired position is point 190, i.e., −15 units. The minus sign switch S− will have been closed so that the relay R3 is picked up and sealed in and the scaling chain 19 is set to a count of "15." With these initial conditions, the reference wave E1 is still depicted by the curve 169 in FIG. 5A, and the control wave E2 is properly depicted by the curve 170 in FIG. 5A, i.e., it leads the reference wave E1 by 27°. The sampling pulses E5 will still occur at time instants represented by the pulse 171 in FIG. 5A. However, with a minus sign signal having been received and the relay R3 picked up, the excitation voltage E3 (curve 191) applied to the stator winding **26*b* is displaced 180° from the curve 169. But because the member 10 and the resolver rotor initially reside at point 165 in FIG. 5, corresponding to −80 units, the rotor voltage E4 (curve 192) leads the excitation voltage or curve 191** by 144°.

As the corrective action of the system is initiated, therefor, the rotor voltage E4 represented by the curve 192 will have a negative value shown by the line 194 at the instants of the sampling pulses 171. Therefore, the output of the phase discriminator is a negative voltage and a motor 15 is energized to drive the member 10 to the right and the resolver rotor in a counterclockwise direction. Because the magnetic field within the rotor is now turning in a counterclockwise direction, this rotation of the resolver rotor results in a progressive shifting of the rotor voltage E4 (curve 194) in a lagging direction so that the zero point **192*a* on the curve 192 is shifted to the right as shown by a series of lines 195 in FIG. 5A until it reaches the position at 196. When the curve 192 has been shifted to that position, the output of the discriminator becomes zero and the member 10** is stopped.

The system shown in FIG. 1 is of simplified form for convenience of illustration and description. In the system illustrated the maximum travel of the member 10 from one position to the next during one operational cycle is 99 units. If this limit is exceeded, the phase displacement between the control wave E2 and the feedback wave E4 would equal or exceed 180° and the system would balance at an undesired position. As a practical matter, however, a series of "coarse" and "fine" control channels may be employed to give positioning in steps as large or as small as may be desired.

It will be seen from the foregoing typical operation cycles that the desired magnitude of the variable condition may be represented by an absolute or "signless" analog variation, in the present case a phase displacement between first and second recurring waves such as the reference wave E1 and the control wave E2. The sign of the variable condition is designated by plus or minus sign signals. In response to such signals the feedback device or resolver 26 is caused to produce a feedback signal signal which always results in the motor 15 being energized to rotate in the correct direction to drive the member 10 from any previous position to the desired position whether it be a positive or negative displacement.

Because the feedback device or resolver 26 may have its rotor initially at any angular position, it becomes necessary to assure that the direction of drive of the movable member or variable condition is always in the proper sense to reach the desired position which has been designated in magnitude by the phase lead of the control wave E2 relative to the reference wave E1 and in sign by the plus or minus sign signal. To assure that the direction of drive does not cause rotation of the rotor in the wrong direction to seek an erroneous balance point, two things are done. First, the direction of rotation of the magnetic field within the resolver 26 is changed as plus or minus sign signals are received so that the direction of phase shift of the rotor voltage E4 for a given direction of rotation of the rotor is reversed. Secondly, the phase of the feedback voltage E4 is made to always lag or lead the control wave E2 when there is a negative or positive position error, regardless of whether a plus or minus sign signal has been received. This is accomplished in the present instance by assuring that the reversible excitation voltage E3 is applied to the rotor winding **26*b* which has maximum coupling with the rotor winding 26*c* when the resolver rotor and the movable member 10 are in their zero positions. This not only reverses the direction of phase shift of the feedback voltage E4 for a given direction of movement of the member 4, but also switches the voltage E4 180° in phase to change its polarity at the sampling instants. Thus the member 10** is still moved in a positive or negative direction when the position error is negative or positive.

It will be apparent that these objectives could also be realized in keeping with the teachings of the present invention by reversing the sense of the excitation voltage applied to the stator winding **26*a* (which has minimum coupling to the rotor winding 26*c* when the latter winding is in its zero or reference position), accompanied by a reversal of the connections of the rotor winding 26*c* to the input of the phase discriminator 16. The change of connections to the stator winding 26*a* will reverse the direction of rotation of the magnetic field in the resolver, while the reversal of connections of the rotor winding 26*c*** will assure that the control signal produced by the phase discriminator is always of the same polarity for a given direction of position error. The same reliable operation will be accomplished.

As another alternative, it would be possible both to switch the sense of the excitation voltage applied to the winding 26a and to reverse the connections of the output terminals 16a, 16b to the motor 15. This would result, first, in a reversal of the direction of rotation of the magnetic field in the resolver 26 when the connections to the winding 26a are switched. It will also assure that when the member 10 is displaced to the left or right of the desired position the control voltage on the discriminator output terminals will always be negative or positive, respectively, so that the motor 15 drives the member 10 to the right or left.

One of the important advantages afforded by the present sign control system is the capability of reversing signs. That is, it is possible to make the apparatus control the variable condition such that it has a negative magnitude when a positive sign is called for, and a positive magnitude when a negative sign is called for. This may be accomplished quite simply by passing the plus sign signals to the negative sign terminal T— and the minus sign signals to the positive sign terminal T+. As illustrated in FIG. 1, a reversing switch RS is employed to interconnect the source of sign signals, i.e., the key switches S+ and S—, to the sign input terminals T+ and T—. When the switch RS is in its "normal" position, its contacts RS*a* and RS*b* connect the switches S+ and S— in series with the terminals T+ and T—. However, when the switch RS is shifted to its "reverse" position, then its contacts RS*a* connect the S+ switch in series with the T— terminal and its contacts RS*b* connect the S— switch in series with the T+ terminal. Thus, with the switch RS in its "reverse" position, a plus sign signal produced by momentary closure of the key switch S+ will result in momentary pick-up of the relay R2 and sealing in of the relay R3 so that the member 10 will be moved to the negative region of the scale 11 and to a point designated by the numbers set into the scaling chain 19. On the other hand, if a minus sign signal is generated by momentary closure of the switch S—, the relay R1 will be momentarily picked up to assure that the relay R3 is deenergized, thereby making the member 10 move to the positive portion of the scale 11 and to a particular position designated by numbers previously set into the scaling chain 19. Where a succession of positions desired for the member 10 are recorded on a record device such as a punched tape, and a tape reader is employed to produce the plus and minus sign signals in lieu of the switches S+ and S—, a simple reversing switch RS enables all of the successive positions of the member 10 to be made symmetrically opposite to those originally designated by information recorded on the punched tape.

We claim as our invention:

1. In apparatus for controlling both the sign and the magnitude of a condition variable about a zero reference value, the combination comprising a source of two recurring signals changeable in relative phase to designate the desired magnitude of said condition, means for generating a plus or a minus sign signal to designate the sign of the desired magnitude of said condition, a feedback device excited with said first recurring signal, said device including means for producing a recurring feedback wave which shifts in phase relative to an excitation signal applied thereto as said condition changes in a one sense or the other, means responsive to a plus sign signal for exciting said feedback device with said first recurring signal to make said feedback wave shift in a lagging or leading sense relative to said first signal as said condition respectively changes in said one sense or the other, means responsive to a minus sign signal for exciting said feedback device with said first recurring signal to make said feedback wave shift in a leading or lagging sense relative to said first signal as said condition respectively changes in said one sense or the other, and means including a phase discriminator responsive to said second recurring signal and said feedback wave for correctively changing said condition until it agrees in sense with the previously received sign signal and in magnitude with the phase separation between said first and second recurring signals.

2. In apparatus for respectively controlling (*a*) the magnitude and (*b*) the sense of a condition variable about a zero reference value according to (*a*) the phase displacement between first and second recurring signals of the same frequency and (*b*) plus or minus sign signals, the combination comprising means responsive to a plus sign signal for producing a first recurring wave which is shifted in phase relative to said first recurring signal in a first or second sense respectively according to positive or negative excursions of said condition from a zero reference value, means responsive to a minus sign signal for producing a second recurring wave which is reversed in phase relative to said first wave when said condition has a zero value and which is shifted in phase relative to said first recurring signal in said second or first sense respectively according to positive or negative excursions of said condition from a zero value, and means including a phase discriminator responsive to said second recurring signal and said first or second recurring wave for changing the value of said condition until the first or second recurring wave is brought into phase agreement with said second recurring signal.

3. In apparatus for respectively controlling (*a*) the magnitude and (*b*) sense of a condition variable about a zero reference value according to (*a*) the phase displacement between first and second recurring signals and (*b*) plus or minus sign signals, the combination comprising, a synchronous resolver device having a movable part and a stator part with inductively coupled electrical elements carried thereby, means for displacing said movable part in opposite directions from a zero position in accordance with positive or negative excursions of said condition from a zero reference value, means responsive to a plus sign signal for exciting the stator element of said device to induce a recurring feedback wave in said movable element which shifts in phase relative to said first recurring signal in a first sense or second sense according to displacement of said movable part respectively in positive or negative directions, means responsive to a minus sign signal for exciting the stator element of said device to cause said recurring feedback wave induced in said movable element to be reversed in phase relative to said first recurring wave when said movable part is at a zero position and to cause said feedback wave to shift in phase relative to said first recurring signal in said second or first sense according to displacement of said movable part respectively in positive or negative directions, means for producing a control signal which is positive or negative in polarity according to the sense of the phase displacement between said second recurring signal and said recurring feedback wave induced in said movable element, and means for changing said condition in a sense which corresponds to the polarity of said control signal.

4. In apparatus for controlling both the sign and magnitude of a condition variable about a zero reference value, the combination comprising means for generating first and second recurring signals of the same frequency which are separated in phase according to the desired magnitude of said condition, means for generating a plus or a minus sign signal, a synchronous resolver having stator windings and a rotor winding, means for moving said rotor winding in one direction or the other from a zero position in response to changes of said condition respectively in one sense or the other from a zero reference value, means responsive to a plus sign signal for exciting said stator windings with said first recurring signal to induce a voltage in said rotor winding which is in phase with said first recurring signal when the rotor winding is in its zero position, means responsive to a minus sign signal for exciting said stator windings with said first recurring signal to cause said

BEST AVAILABLE COP' voltage induced in said rotor winding to be reversed in phase relative to said first recurring signal when said rotor winding is in its zero position, a phase discriminator connected to receive as inputs the second recurring signal and the voltage induced in said rotor winding, and means responsive to the output of said phase discriminator for changing said condition until the inputs of said discriminator are brought into phase agreement.

5. In apparatus for controlling both the sign and the magnitude of a condition which is variable about a zero reference value, the combination comprising a source of two recurring signals adjustable in relative phase to designate the desired value of said condition, means for creating a plus or a minus sign signal to designate the sign of the desired value of said condition, a synchronous resolver device having a stator with first and second windings physically separated by 90° and a rotor with a winding thereon, means for angularly turning said rotor in first or second directions from a zero position as said condition respectively changes positively or negatively from a zero reference value, said zero position of said rotor being that in which said first stator winding has maximum inductive coupling to said rotor winding, means for exciting said second stator winding with a sinusoidal signal displaced 90° in phase relative to said first recurring signal, means responsive to a plus sign signal for exciting said first stator winding with a sinusoidal signal in phase with said first recurring signal, means responsive to a minus sign signal for exciting said first stator winding with a sinusoidal signal reversed in phase relative to said first recurring signal, a phase discriminator connected to receive as inputs said second recurring signal and the voltage induced in said rotor winding, and means responsive to the output of said discriminator for correctively changing said condition.

6. In apparatus for controlling both (*a*) the sign and (*b*) the magnitude of a condition variable about a zero reference value according to (*a*) a plus or a minus sign signal and (*b*) the magnitude of an analog signal, the combination comprising a synchronous resolver having a stator and a rotor with a plurality of stator windings and a rotor winding respectively disposed thereon, means for turning said rotor in one direction or the other from a zero position in response to changes of said condition in one sense or the other from a zero reference value, the said zero position of said rotor being a position at which a predetermined one of said stator windings has a maximum coupling with said rotor winding, means responsive to a plus sign signal for exciting said stator windings with sinusoidal voltages to induce a condition magnitude-representing voltage in said rotor winding, means responsive to a minus signal for changing by 180° the phase of the sinusoidal voltage which is applied to said predetermined one of said stator windings, and means responsive to said analog signal and said rotor voltage for correctively changing said condition until the magnitude represented by the rotor voltage agrees with that represented by said analog signal.

7. In apparatus for positioning a movable member to selected positive or negative positions relative to a zero position, the combination comprising means for generating an analog signal which in value represents magnitude of the desired position of said member, means for generating a feedback wave which cyclically shifts from a zero value as said member is moved from its zero position, means for generating a plus sign signal on a minus sign signal to designate sense of the desired position, means responsive to a plus sign signal for causing said feedback wave to shift in one sense or the opposite sense as said member is respectively moved in a first or second direction, means responsive to a minus sign signal for causing said feedback wave to shift in said opposite sense or said one sense as said member is respectively moved in said first or second direction, means responsive to said analog signal and said feedback wave for creating a control signal having one polarity or the opposite polarity when the actual position of said member is negative or positive relative to the desired position, and means responsive to said control signal when it has said one or said other polarity for moving said member in positive or negative directions until said fedback wave is in agreement with said analog signal.

8. In apparatus for positioning a member movable in opposite directions from a zero reference position, the combination comprising means for generating first and second recurring signals of the same frequency which are separated in phase according to the magnitude of the desired position, means for generating a plus or minus signal to designate the sign of the desired position, means responsive to a plus sign signal for producing a recurring feedback wave which is shifted cyclically in phase relative to said first recurring signal in a first or second sense respectively according to positive or negative displacements of said member from its zero position, means responsive to a minus sign signal for causing said recurring feedback wave to be shifted in phase relative to said first recurring signal in said second or said first sense, respectively, according to positive or negative displacements of said member from its zero position, means including a phase discriminator responsive to said second recurring signal and said feedback wave for producing a control signal having one polarity or the other when the actual position of said member is displaced positively or negatively from the desired position, and means responsive to said control signal when it has said one polarity or said other polarity for driving said member in a negative or positive direction, respectively, until said second recurring signal and said feedback wave are brought into phase agreement.

9. In apparatus for positioning a member movable in opposite directions from a zero reference position, the combination comprising means for generating first and second recurring signals of the same frequency which are separated in phase according to the desired magnitude of displacement of said member from said reference position, means for generating a plus or minus sign signal to designate the sign of the desired position of said member, a synchronous resolver having stator windings and a rotor winding, means for turning said rotor winding in one direction or the other from a zero position in response to movement of said member respectively in a positive or negative direction from its zero position, means responsive to a plus sign signal for exciting said stator windings from said first recurring signal to induce a voltage in said rotor winding which is in phase with said first recurring signal when the rotor winding is in its zero position, means responsive to a minus sign signal for exciting said stator windings from said first recurring signal to cause said voltage induced in said rotor winding to be reversed in phase relative to said first recurring signal when said rotor winding is in its zero position, a phase discriminator connected to receive as inputs the second recurring signal and the voltage induced in said rotor winding, and means responsive to the output of said phase discriminator for moving said member until the inputs of said discriminator are brought into phase agreement.

10. In apparatus for controlling both the sign and the magnitude of the displacement of a member movable in opposite directions from a zero reference position, the combination comprising means for generating first and second signals displaced in phase according to the magnitude of the desired displacement of said member, means for generating a plus or minus sign signal to designate the sign of the desired displacement, a two phase synchronous resolver having a stator with first and second windings physically separated by 90° and a rotor with a winding thereon, means for angularly turning said rotor in first or second directions from a zero position as said member is moved respectively in positive or negative directions from its zero reference position, said zero position of said rotor being that in which said first stator winding has maxi-

BEST AVAILABLE COP' mum coupling to said rotor winding, means for exciting said second stator winding with a sinusoidal signal displaced 90° in phase relative to said first recurring signal, means responsive to a plus sign signal for exciting said first stator winding with a sinusoidal signal in phase with said first recurring signal, means responsive to a minus sign signal for exciting said first stator winding with a sinusoidal signal reversed in phase relative to said first recurring signal, a phase discriminator connected to receive as inputs said second recurring signal and the voltage induced in said rotor winding, and means responsive to the output of said discriminator for correctively moving said member to the desired position.

References Cited in the file of this patent

UNITED STATES PATENTS

| | | |
|---|---|---|
| 2,760,132 | Pawley | Aug. 21, 1956 |
| 2,943,248 | Ritchie | June 28, 1960 |